(12) United States Patent
Teng et al.

(10) Patent No.: US 12,602,283 B2
(45) Date of Patent: Apr. 14, 2026

(54) FLASH MEMORY CONTROLLER AND FLASH MEMORY ACCESS METHOD

(71) Applicant: Silicon Motion Inc., Jhubei City (TW)

(72) Inventors: Duen yih Teng, Jhubei City (TW);
Mao ruei Li, Jhubei City (TW)

(73) Assignee: Silicon Motion Inc., Jhubei City (TW)

( * ) Notice: Subject to any disclaimer, the term of this patent is extended or adjusted under 35 U.S.C. 154(b) by 45 days.

(21) Appl. No.: 18/920,941

(22) Filed: Oct. 20, 2024

(65) Prior Publication Data

US 2025/0328418 A1      Oct. 23, 2025

(30) Foreign Application Priority Data

Apr. 22, 2024    (TW) ................................. 113114974

(51) Int. Cl.
*G06F 11/10*              (2006.01)
(52) U.S. Cl.
CPC ...... *G06F 11/1048* (2013.01); *G06F 11/1068* (2013.01)
(58) Field of Classification Search
None
See application file for complete search history.

(56) References Cited

U.S. PATENT DOCUMENTS

| 8,739,001 B2 | 5/2014 | Tsatsaragkos et al. |
| 9,548,764 B1 | 1/2017 | Chilappagari et al. |
| 10,725,860 B2 | 7/2020 | Avraham et al. |
| 2011/0264986 A1* | 10/2011 | Chin .................... H03M 13/116 |
| | | 714/763 |
| 2013/0275827 A1* | 10/2013 | Wang .................. G06F 11/1076 |
| | | 714/752 |
| 2013/0283131 A1* | 10/2013 | Tsatsaragkos .... H03M 13/6505 |
| | | 714/776 |
| 2014/0089757 A1* | 3/2014 | Yang .................... H03M 13/116 |
| | | 714/752 |

(Continued)

FOREIGN PATENT DOCUMENTS

WO        2019001046 A1    1/2019

OTHER PUBLICATIONS

X. Chen and C.-L. Wang, "Exploiting the shift property of structured LDPC codes for reduced-complexity sliced message passing based decoder design," 2012 International Conference on Computing, Networking and Communications (ICNC), Maui, HI, USA, 2012, pp. 471-475, (Year: 2012).*

*Primary Examiner* — Daniel F. McMahon
(74) *Attorney, Agent, or Firm* — The Roy Gross Law Firm, LLC; Roy D. Gross

(57)              ABSTRACT

A flash memory controller and a flash memory access method are provided. The flash memory controller comprises a decoder. The decoder is configured to perform a decoding operation based on a N×M base matrix of a LDPC code to decode the read information from a flash memory. The decoder comprises a controller, a variable node (VN) unit, and a check node (CN) unit. The controller is configured to transform the base matrix into a compressed matrix of size N×S, where S is smaller than M. The VN unit and the CN unit are configured to perform message updates between variable nodes and check nodes to generate decoding results that converge to a codeword. During each decoding cycle, the VN unit performs calculations on each column of the compressed matrix.

20 Claims, 8 Drawing Sheets

(56)                    References Cited

U.S. PATENT DOCUMENTS

| | | | |
|---|---|---|---|
| 2015/0012795 A1* | 1/2015 | Sakaue | G06F 11/1012 |
| | | | 714/758 |
| 2015/0067440 A1* | 3/2015 | Owen | H03M 13/1111 |
| | | | 714/758 |
| 2016/0336967 A1* | 11/2016 | Boutillon | H03M 13/1128 |
| 2017/0019125 A1 | 1/2017 | Matsumoto et al. | |

* cited by examiner

10

112

| | S1 | | S2 | | S3 | | S4 | | S5 | | S6 | | S7 | | S8 | | S9 | | | S10 | | | S11 | | |
|---|---|---|---|---|---|---|---|---|---|---|---|---|---|---|---|---|---|---|---|---|---|---|---|---|---|
| | M1 | M2 | M3 | M4 | M5 | M6 | M7 | M8 | M9 | M10 | M11 | M12 | M13 | M14 | M15 | M16 | M17 | M18 | M19 | M20 | M21 | M22 | M23 | M24 | M25 |
| N1 | 80 | | | 60 | 169 | | 11 | | 143 | | | 222 | | 59 | | 218 | | 19 | | | | 85 | 178 | | |
| N2 | | 0 | | 0 | | 0 | | 0 | | | 0 | | 0 | | | 0 | | 0 | | 0 | | | | 0 | |
| N3 | | 91 | | 74 | 237 | 202 | | | 201 | | 136 | | 178 | | 239 | | 183 | | | | 217 | | | | 2 |
| N4 | 105 | | | 87 | | 43 | | 165 | 180 | | | 80 | 227 | | 221 | | 77 | | | | 0 | | | | |
| N5 | | 170 | 250 | | 195 | 139 | | | 135 | | 92 | | 147 | | | 1 | | | 135 | | | | | | |
| N6 | | 45 | | 37 | | 49 | 150 | | 65 | | 177 | 44 | | 70 | | 95 | | | | 221 | | | 214 | | |
| N7 | 137 | | 104 | | 238 | | 228 | | 225 | 247 | | | 191 | | 177 | | 51 | | 255 | | | | | | |
| N8 | | 118 | 15 | 93 | | | 228 | | 78 | | 16 | 0 | | 48 | | 0 | | | | | 0 | | | | 0 |
| N9 | | 208 | 0 | | 0 | | 0 | | 0 | | | | 251 | 0 | | | | 0 | | 44 | | | 123 | | |
| N10 | 0 | | | 123 | | 41 | 91 | | 211 | | 217 | | 243 | | 97 | 252 | | | | | | | 0 | | |
| N11 | 209 | | 252 | | 39 | | 159 | 69 | | | 37 | | 134 | | 201 | 49 | | | | | | | | | 94 |
| N12 | 53 | | 93 | | 216 | | | 57 | 9 | | 130 | | | 130 | | 238 | | | 91 | | | 36 | | 162 | |

| | S12 | | | S13 | | | | S14 | | S15 | | | S16 | | | S17 | | | S18 | | |
|---|---|---|---|---|---|---|---|---|---|---|---|---|---|---|---|---|---|---|---|---|---|---|
| | M26 | M27 | M28 | M29 | M30 | M31 | M32 | M33 | M34 | M35 | M36 | M37 | M38 | M39 | M40 | M41 | M42 | M43 | M44 | M45 | M46 |
| N1 | | | 247 | | | | 105 | | | 126 | | | | 211 | | | | 94 | | | |
| N2 | 0 | | | | | 0 | | | | | | 0 | | | 0 | | | | | | 0 |
| N3 | | | 76 | 232 | | | | | | | 129 | 60 | | | | | | | | | 19 |
| N4 | | 252 | | | | 16 | | | | 96 | | 0 | | | | | 36 | | 17 | | |
| N5 | 13 | | | | 98 | | 142 | | | 225 | | | | | | 23 | | 108 | | | |
| N6 | | | | | | 192 | | | | | | | | 51 | | 19 | | | 100 | | |
| N7 | | | | 192 | | | | | 136 | | | 195 | 0 | | | | 0 | 172 | | | |
| N8 | 62 | | | 0 | | | | 0 | 0 | | | | | | | 112 | | | 0 | | |
| N9 | | 0 | | | 0 | | 0 | | 0 | | | | 0 | | | | | | | | |
| N10 | | | | 0 | | | | | 145 | 41 | | | | 29 | | | | 0 | | | |
| N11 | | 157 | 104 | | | | 129 | | | | | 222 | | | | 139 | | | | | |
| N12 | | 0 | | 144 | | | | | | | | | 175 | | | 0 | | | | | 145 |

| | S19 | | | S20 | | | S21 | | | S22 | | | S23 | | | S24 | | | S25 | | | S26 | S27 |
|---|---|---|---|---|---|---|---|---|---|---|---|---|---|---|---|---|---|---|---|---|---|---|---|
| | M47 | M48 | M49 | M50 | M51 | M52 | M53 | M54 | M55 | M56 | M57 | M58 | M59 | M60 | M61 | M62 | M63 | M64 | M65 | M66 | M67 | M68 | M69 |
| N1 | 255 | | | | | 246 | | | | | 242 | | | | | | | 19 | | 129 | | 58 | 27 |
| N2 | | 0 | | | 0 | | | 0 | 0 | | | | | | | 0 | | | | | | 0 | |
| N3 | | | 77 | | | 101 | | | 169 | | 217 | | | | 48 | | | | | | | 172 | 42 |
| N4 | | 219 | | 165 | | | | 198 | | 171 | | | | | | | | 228 | | | | 39 | 234 |
| N5 | | 0 | 0 | | | 121 | | | | 0 | | | | | 46 | 0 | | | | | 242 | 228 | |
| N6 | | 235 | | | 4 | 251 | | 128 | | | | 109 | | | | | | 140 | | 193 | 21 | | |
| N7 | | 219 | | 236 | | | | | | | 159 | | 10 | | | | | 5 | 25 | 94 | | | |
| N8 | | | | | | 22 | | 0 | | | | 0 | | 0 | | | | | 120 | 192 | | | |
| N9 | | 153 | | | 0 | | 0 | | | | | 0 | | 0 | 16 | 0 | | | | | | | |
| N10 | 0 | | | | 0 | | | 193 | | | 46 | 140 | | | 58 | 202 | 215 | | | | | | |
| N11 | 39 | | | 208 | | | 194 | | 3 | | 43 | | | 153 | | 207 | 109 | | | | | | |
| N12 | | | | | 22 | | | | 0 | | 0 | | 212 | | | 0 | 69 | 88 | | | | | |

FIG. 3

| | |
|---|---|
| 80 | |
| | 0 |
| | 91 |
| 105 | |
| | 170 |
| | 46 |
| 137 | |
| | 118 |
| | 208 |
| 0 | |
| 209 | |
| 53 | |

| | |
|---|---|
| 80 | h(1,1) |
| 0 | h(2,2) |
| 91 | h(2,3) |
| 105 | h(1,4) |
| 170 | h(2,5) |
| 46 | h(2,6) |
| 137 | h(1,7) |
| 118 | h(2,8) |
| 208 | h(2,9) |
| 0 | h(1,10) |
| 209 | h(1,11) |
| 53 | h(1,12) |

| | | |
|---|---|---|
| 80 | 0 | h(1,1) |
| 105 | 0 | h(1,4) |
| 137 | 0 | h(1,7) |
| 0 | 0 | h(1,10) |
| 209 | 0 | h(1,11) |
| 53 | 0 | h(1,12) |
| 0 | 1 | h(2,2) |
| 91 | 1 | h(2,3) |
| 170 | 1 | h(2,5) |
| 46 | 1 | h(2,6) |
| 118 | 1 | h(2,8) |
| 208 | 1 | h(2,9) |

FIG. 4

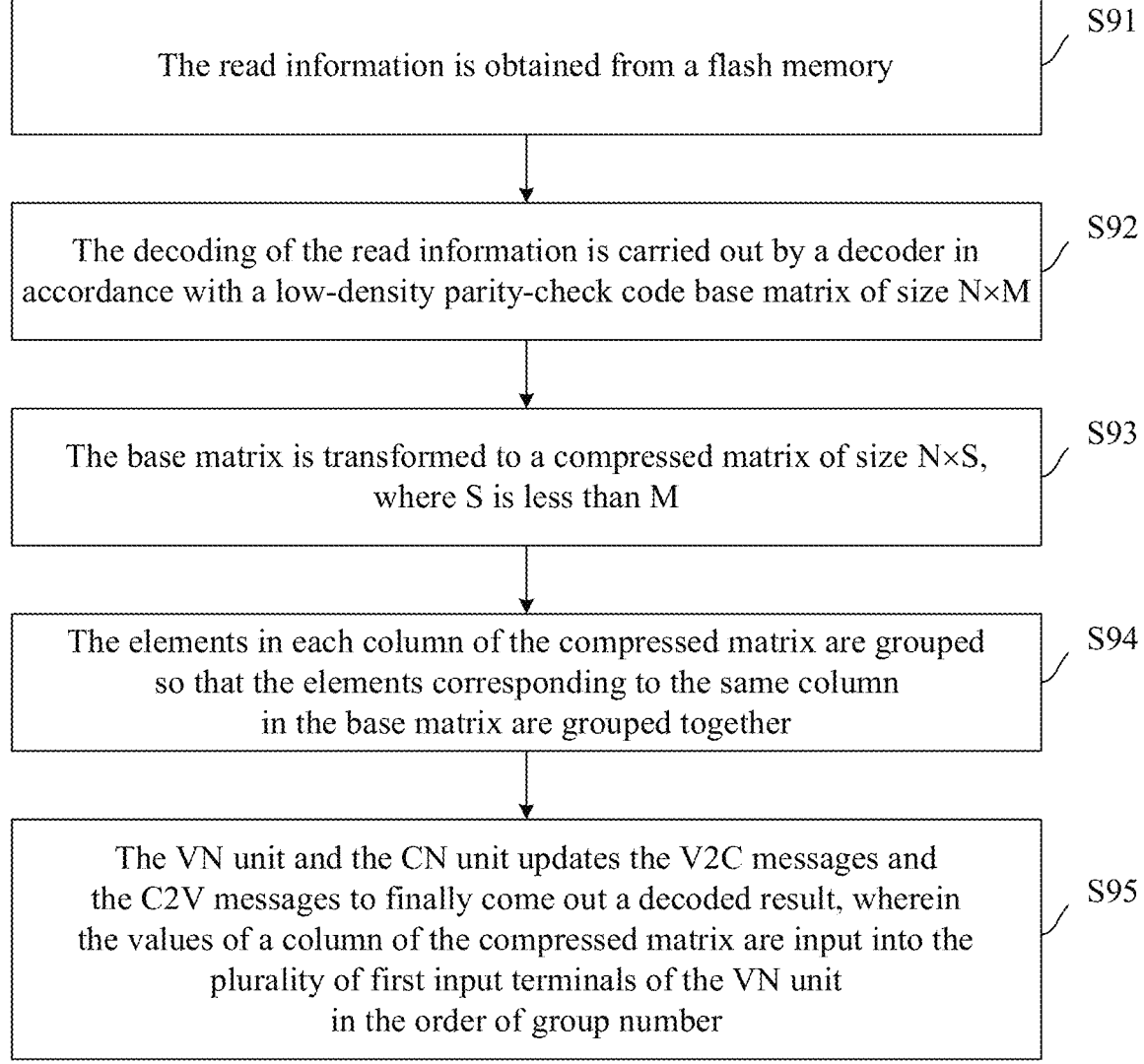

The read information is obtained from a flash memory /S91

The decoding of the read information is carried out by a decoder in accordance with a low-density parity-check code base matrix of size N×M /S92

The base matrix is transformed to a compressed matrix of size N×S, where S is less than M /S93

The elements in each column of the compressed matrix are grouped so that the elements corresponding to the same column in the base matrix are grouped together /S94

The VN unit and the CN unit updates the V2C messages and the C2V messages to finally come out a decoded result, wherein the values of a column of the compressed matrix are input into the plurality of first input terminals of the VN unit in the order of group number /S95

FIG. 9

FLASH MEMORY CONTROLLER AND FLASH MEMORY ACCESS METHOD

CROSS REFERENCE TO RELATED INVENTIONS

This invention claims priority to Taiwan Patent Invention No. 113114974, filed Apr. 22, 2024, the entire contents of which are incorporated herein by reference.

FIELD OF DISCLOSURE

The present invention relates to a storage device, particularly involving a flash memory controller and a flash memory access method.

BACKGROUND

NAND flash memory stands as a prominent storage solution in today's digital landscape. For ensuring reliability of NAND flash data, the utilization of error correction is crucial. Low-density parity-check (LDPC) is a highly efficient and fast channel encoder/decoder technology commonly employed in error-correcting code (ECC) for NAND flash memory. By utilizing an LDPC decoder, data read from flash memory can be decoded and corrected.

However, in conventional technologies, the variable node (VN) unit of the LDPC decoder must conduct calculations on every column of the base matrix during each iteration. The decoding cycle count in an iteration is determined by the number of columns in the base matrix. This leads to time consumption and efficiency reduction, particularly when dealing with a large size LDPC base matrix.

SUMMARY OF DISCLOSURE

In order to tackle the aforementioned technical issues, the objective of this invention is to offer a flash memory controller and flash memory access method that can reduce the VN unit decoding cycles per iteration, thereby drastically enhancing the decoding throughput.

On one hand, this invention provides a flash memory controller for accessing a flash memory. The flash memory controller comprises: a read-only memory for storing a program code; a microprocessor for executing the program code to control access to the flash memory; and a decoder for performing decoding operation based on an N×M base matrix of a low-density parity-check (LDPC) code to decode read information from the flash memory, wherein the decoder comprises: a controller for transforming the base matrix into a compressed matrix of size N×S, wherein S is less than M, each element in each column of the compressed matrix is associated with a group number, and the elements from the same column of the base matrix are assigned the same group number; a variable node (VN) unit, coupled to the controller and comprises a plurality of first input terminals; a check node (CN) unit, coupled to the VN unit, wherein, in an iterative manner, the VN unit updates a plurality of V2C messages to the CN unit and the CN unit updates a plurality of C2V messages to the VN unit in order to finally generate a decoding result; wherein in each decoding cycle per iteration, the VN unit receives a column of the compressed matrix through the plurality of first input terminals as input values, the elements of the column of the compressed matrix are ordered according to the group number before being input to the plurality of first input terminals.

In some embodiments, the VN unit comprises a column-sum calculation circuit, comprising a plurality of adders and a group-selection circuit. The column-column-sum calculation circuit calculates a plurality of total values based on the input values and the group-selection circuit selects the sum values to generate total value of each group of input values.

In some embodiments, the plurality of first input terminals are divided into a plurality of subsets, with each subset being connected to an adder, and the input values on each subset of the first input terminals are associated with the same group number.

In some embodiments, the controller of the decoder comprises a grouping unit that merges at least two columns of the base matrix according to a grouping strategy, which ensures that each row within the at least two columns of the base matrix contain at most one non-blank element.

In some embodiments, the grouping strategy further ensures that the number of non-blank elements in the at least two columns of the base matrix is at most N, and the VN unit performs calculation on a column of the compressed matrix to update the V2C messages.

In some embodiments, the number of the plurality of first input terminals of the VN is N, and the elements in a column of the compressed matrix are entered to the plurality of first input terminals in an order of group number.

In some embodiments, the grouping strategy further comprises: the maximum number of non-blank elements in the at least two columns of the base matrix is P, with P being less than N; and when the number of non-blank elements in a column of the base matrix is greater than P, the column of the base matrix is split to form two columns in the compressed matrix.

In some embodiments, the VN unit further contains registers to store the total value of the plurality of first input terminals of the VN unit in the previous decoding cycle, and the VN unit adds the total value of the plurality of first input terminals of the VN unit in the current decoding cycle with the values of the registers to obtain the total value of two neighboring columns in the compressed matrix.

In some embodiments, the number of the plurality of first input terminals of the VN is P, and elements in a column of the compressed matrix are entered to the plurality of first input terminals in an order of group.

In some embodiments, the decoder further comprises a C2V unit coupled between the VN unit and the CN unit to update the C2V messages for the VN unit.

In the second aspect, this invention provides flash memory access method, applied to a memory controller. The method comprises: receiving read information from a flash memory; decoding, through a decoder in the memory controller, the read information in accordance with a low-density parity-check (LDPC) code base matrix of size N×M; transforming the base matrix into a compressed matrix of size N×S, wherein S is less than M; grouping elements in each column of the compressed matrix so that each element in each column of the compressed matrix is associated with a group number and the elements from the same column of the base matrix are assigned the same group number; updating a plurality of V2C messages and C2V messages, through a variable node (VN) unit and a check node (CN) unit of the memory controller, wherein, for each decoding cycle, elements in a column of the compressed matrix are entered as input values to a plurality of first input terminals of the VN unit in an order of group number.

In some embodiments, the VN unit comprises a column summation circuit containing a plurality of adders and a group-selection circuit, and the method further comprises:

the column-column-sum calculation circuit calculates a plurality of total values based on the input values and the group-selection circuit selects the total values to generate total value of each group of input values.

In some embodiments, the plurality of first input terminals are divided into a plurality of subsets, with each subset being connected to an adder, and the input values on each subset of the first input terminals are associated with the same group number.

In some embodiments, the transforming the base matrix into a compressed matrix of size N×S comprises merging at least two columns of the base matrix according to a grouping strategy, which ensures that each row within the at least two columns of the base matrix contain at most one non-blank element.

In some embodiments, the grouping strategy further ensures that the number of non-blank elements in the at least two columns of the base matrix is at most N, and the VN unit performs calculation on a column of the compressed matrix to update the V2C messages.

In some embodiments, the number of the plurality of first input terminals of the VN is N, and the elements in a column of the compressed matrix are entered to the plurality of first input terminals in an order of group number.

In some embodiments, the grouping strategy further comprises: the maximum number of non-blank elements in the at least two columns of the base matrix is P, with P being less than N; and when the number of non-blank elements in a column of the base matrix is greater than P, the column of the base matrix is split to form two columns in the compressed matrix.

In some embodiments, the VN unit further contains registers to store the total value of the plurality of first input terminals of the VN unit in the previous decoding cycle, and the VN unit adds the total value of the plurality of first input terminals of the VN unit in the current decoding cycle with the values of the registers to obtain the total value of two neighboring columns in the compressed matrix.

In some embodiments, the number of the plurality of first input terminals of the VN is P, and elements in a column of the compressed matrix are entered to the plurality of first input terminals in an order of group.

In some embodiments, the decoder further comprises a C2V unit coupled between the VN unit and the CN unit to update the C2V messages for the VN unit.

Compared to the conventional technologies, this invention provides a flash memory controller and flash memory access method that transforms the base matrix into a compressed matrix with fewer columns, thereby reducing VN unit decoding cycle count for each iteration, thereby drastically enhancing the decoding throughput.

BRIEF DESCRIPTION OF DRAWINGS

FIG. 3 illustrates the base matrix employed in the IEEE 802.3ca standard protocol.

FIG. 4 illustrates a schematic diagram of grouping operation according to the first embodiment.

FIG. 9 illustrates a flowchart of the flash memory access method according to an embodiment of the present invention.

DETAILED DESCRIPTION

Figure 1:
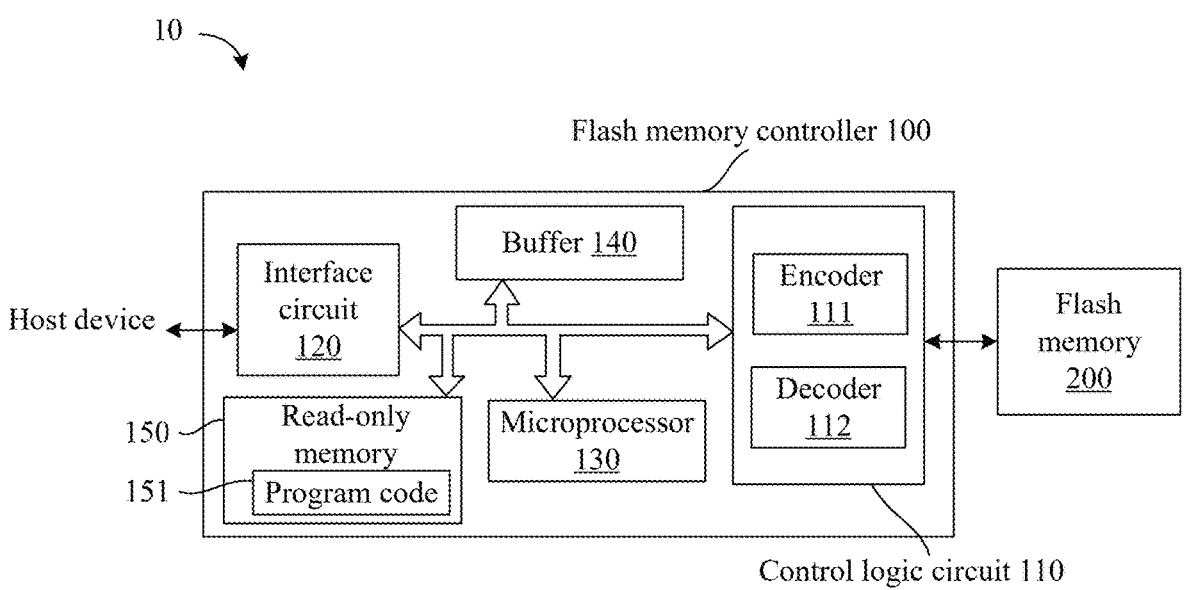
FIG. 1 illustrates a block diagram of a memory device according to an embodiment of the present invention.

The exemplary embodiments of the present disclosure will now be elaborated upon with reference to the accompanying drawings. However, it should be noted that these exemplary embodiments can take many forms and should not be interpreted as being confined to the embodiments set forth herein. Instead, these embodiments are provided to ensure that this disclosure is comprehensive and thorough, and effectively communicates the full scope of the disclosure to those skilled in the art. The drawings are merely schematic illustrations of the disclosure, and the components depicted in the drawings are not necessarily drawn to scale. Identical reference numerals in the drawings denote identical or similar parts, hence, repeated descriptions thereof will be omitted for brevity.

In information transmission systems, the transmitter manipulates the original message using an encoder. The encoder appends a specific number of parity-check codes to the original message to form a codeword. The codeword is transmitted through a channel, leading to the receiver receiving a message. The decoder located at the receiver's end analyzes the received message to identify any errors introduced by channel noise. If errors are found, the decoder will perform a corresponding error correction algorithm. By rectifying these errors, the decoder can recover the original codeword and retrieve the original message. The following content takes a memory device as an example to demonstrate the application scenario of an information transmission system.

Please refer to FIG. 1, which illustrates a block diagram of a memory device 10 according to an embodiment of the present invention. The memory device 10 comprises a flash memory controller 100 and a flash memory 200. The flash memory controller 100 is responsible for controlling the operation of the memory device 10 and accessing the flash memory 200, which is utilized for data storage. The memory device 10 may comprise, but is not limited to, solid-state drives and various types of embedded memory devices, such as those that adhere to the Peripheral Component Interconnect Express (PCIe) standard.

As shown in FIG. 1, the flash memory controller 100 may comprise a control logic circuit 110, an interface circuit 120, a microprocessor 130, a buffer 140, and a read-only memory 150. Through the control logic circuit 110, the flash memory controller 100 is coupled to the flash memory 200 for data and command transmission. The flash memory controller 100 is capable of communicating with a host device through the interface circuit 120. The microprocessor 130 is coupled to the control logic circuit 110, the interface circuit 120, the buffer 140, and the read-only memory 150. The buffer 140 could be, but is not limited to, a dynamic random-access memory (DRAM), a static random-access memory (SRAM), or any other type of volatile memory. The read-only memory 150 is utilized for storing a program code 151.

Optionally, the host device may comprise processor(s) and power supply circuit(s) that are interconnected. The processor can be utilized to control the operation of the host device, while the power supply circuit can deliver power to the processors and memory device 10, as well as generate one or more driving voltages for the memory device 10. The memory device 10 can be utilized to offer storage capacity for the host device and receives one or more driving voltages as the power source from the host device. The host device could include, but is not limited to, a mobile device, a wearable device, a tablet, or a personal computer such as a desktop or a laptop.

Optionally, the interface circuit 120 of the flash memory controller 100 may adhere to various communication standards, such as Serial Advanced Technology Attachment (SATA) standard, Peripheral Component Interconnect (PCI) standard, PCIe standard, Universal Flash Storage (UFS) standard, etc., and communicate with the host device accordingly. The host device may comprise a corresponding interface circuit that conforms to the specific communication standard for communication between the host device and the memory device 10.

In some embodiments, the flash memory controller 100 has the capability to utilize its internal components to execute various the program code 151 through the microprocessor 130 in order to carry out a variety of control operations. The control operations include controlling access to the flash memory 200 through the control logic circuit 110, facilitating communication with the host device through the interface circuit 120, and carrying out buffering functions through the buffer 140. For example, the host device is able to send host commands, and the associated logic addresses to the flash memory controller 100. The microprocessor 130 within the flash memory controller 100 receives the host commands and the associated logic addresses through the interface circuit 120, converts these host commands into memory operation commands, and uses the control logic circuit 110 to control the flash memory 200, reading and/or writing specific memory units (such as data pages) at physical addresses within the flash memory 200 that correspond to the logic addresses.

As illustrated in FIG. 1, the control logic circuit 110 may comprise an encoder 111 and a decoder 112. The encoder 111 is responsible for encoding the data to be written into the flash memory 200, and the decoder 112 decodes the data received from the flash memory 200.

In some embodiments, the flash memory controller 100 is capable of accessing the flash memory 200 according to the logic address of the write command from the host device, where the logic address could be a logical block address or another type of logic address. Specifically, when the host device sends a write command, the data intended for writing can be temporarily saved in the buffer 140. The microprocessor 130 has the capability to convert/decode the host device's write command (including a logic address) into corresponding internal control signals (including a physical address of the flash memory 200) and provide the internal control signals to the control logic circuit 110 and/or the buffer 140. The encoder 111 in the control logic circuit 110 has the capability to encode the data stored in buffer 140 into codewords. Based on the internal control signals, the control logic circuit 110 is able to address/control the flash memory 200 for writing the codewords into the flash memory 200.

In some embodiments, when the host device sends a read command, the microprocessor 130 has the capability to convert/decode the host device's read command (including a logical address) into corresponding internal control signals (including a physical address of the flash memory 200). Based on the internal control signals, the control logic circuit 110 is able to address/control the flash memory 200 for reading out codewords from the flash memory 200. The decoder 112 within the control logic circuit 110 is capable of performing decoding operations in accordance with the base matrix of the LDPC code to decode the codewords retrieved from the flash memory into decoded data and temporarily storing the decoded data in the buffer 140. Subsequently, the microprocessor 130 can send the data stored in the buffer 140 to the host device.

It should be understandable that the flash memory 200 mentioned above can be a NAND flash memory. NAND flash, being one of the mainstream storage media nowadays, boasts high performance, high density, non-volatility, and low power consumption. Error correction is vital to ensure the reliability of NAND flash data, therefore, it is essential to develop a dedicated controller (such as the aforementioned flash memory controller 100) for data management. LDPC is a highly efficient and high-speed channel encoder/decoder technology that is extensively utilized in ECC technology for NAND flash. Specifically, as previously stated, the flash memory controller 100 utilizes the LDPC encoder (such as the encoder 111) to write data to the flash memory 200 and can send the data retrieved from the flash memory 200 to the LDPC decoder (such as the decoder 112) for error correction and decoding purposes.

Figure 2:
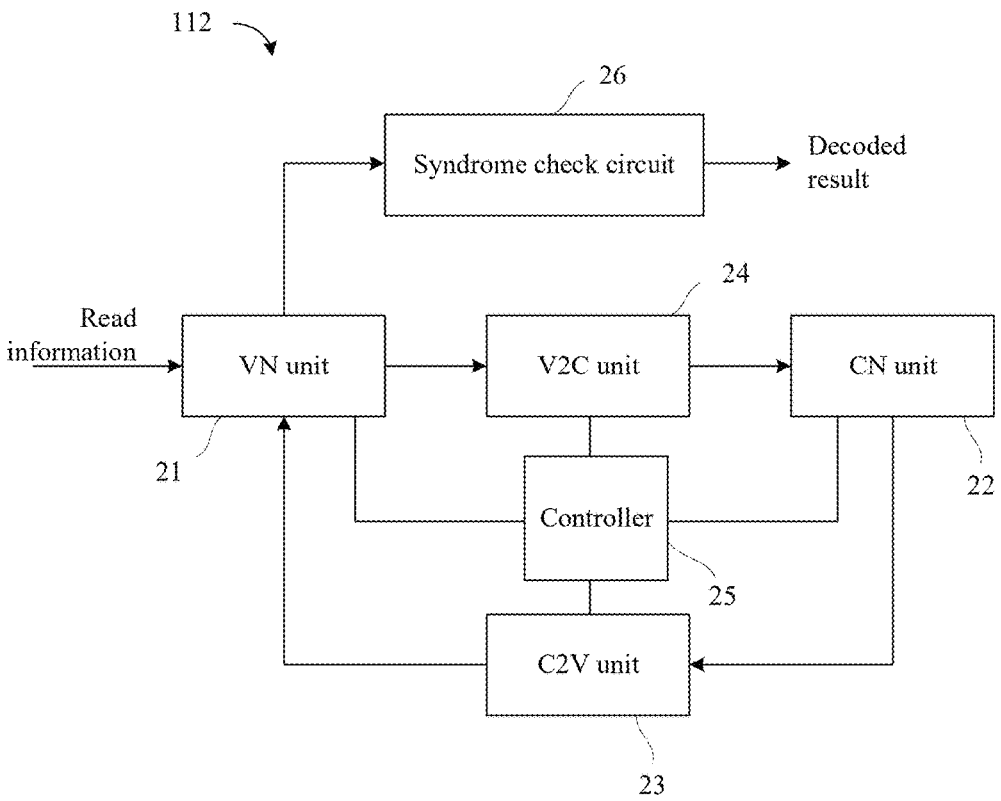
FIG. 2 illustrates a block diagram of the decoder in FIG. 1.

Please refer to FIG. 2, which illustrates the block diagram of the decoder in FIG. 1. The decoder 112 performs LDPC iterative calculations to decode the original codeword (read information, or channel value) and derive the original and noise-free codeword (decoded result), from which the original data is extracted. Optionally, the read information can be temporarily stored in the buffer 140 or in the channel memory, but not limited to these. The decoder 112 comprises a variable node (VN) unit 21, a check node (CN) unit 22, a C2V (CN to VN) unit 23, a V2C (VN to CN) unit 24, a controller 25, and a syndrome check circuit 26. The VN unit 21, the CN unit 22, the C2V unit 23, the V2C unit 24, and the controller 25 are coupled with each other, and the VN unit 21 is further coupled with the syndrome check circuit 26.

As shown in FIG. 2, the VN unit 21 and the CN unit 22 perform message updates between the variable nodes and the check nodes to finally generate the decoded result, which suppose should converge to form a codeword. Specifically, based on the C2V messages, the VN unit 21 calculates the V2C messages which are to be sent from the variable nodes to the check nodes. The CN unit 22 calculates the C2V messages which are to be sent from the check nodes to the variable nodes based on the V2C messages. The controller 25 converts the base matrix of size N×M into a compressed matrix of size N×S, with specific conversion method to be detailed later. The C2V unit 23 receives the C2V messages, performs grouping operation and rotation operation, and forwards them to the VN unit 21. The V2C unit 24 receives the V2C messages, performs de-grouping operation and rotation operation, and forwards them to the CN unit 22. The syndrome check circuit 26 checks if the decoded codeword matches the equation: $C \times H^T = S = 0$, where H is the base matrix, C is the decoded codeword from the VN unit 21, and S is the syndrome value. When S is equal to zero, it indicates that the decoded codeword from the VN unit 21 is the decoded result and the decoding process is complete.

In this embodiment, a single iteration consists of updating V2C messages for all variable nodes and updating C2V messages for all check nodes. The decoder 112 will evaluate whether the LDPC iteration computation has achieved convergence to a decoded result after each iteration. Through multiple iterations in the computation of the LDPC algorithm, when the decoded codeword from the VN unit 21 converges, indicating a successful LDPC decoding, the decoder 112 will then cease the LDPC iteration computation.

It should be understandable that LDPC codes are widely embraced in many latest communication standards, being utilized across various communication systems. The implementation of the LDPC decoder and its decoding algorithm within the IEEE 802.3ca system serves as an example to illustrate the embodiments of the LDPC decoder proposed in the present invention. It should be understandable that this invention could also be applied to other communication systems, not limited to the example addressed herein.

Please refer to FIG. 3, which illustrates the base matrix employed in the IEEE 802.3ca standard protocol. In the 802.3ca system, the size of the base matrix is 12×69. The base matrix defines the connection relationships between the variable nodes and the check nodes. The number of rows in the base matrix represents the number of the check nodes, while the number of columns represents the number of the variable nodes. During the LDPC algorithm process, messages are exchanged between the variable nodes and the check nodes.

It should be understandable that the task of "calculating V2C messages for all variable nodes" in the VN unit 21 involves performing calculations on each column of the base matrix sequentially. In other words, in conventional technologies, the VN unit 21 needs to perform 69 decoding cycles for each iteration, which can be time-consuming and inefficient. In order to improve the above drawbacks, the present invention proposes a grouping operation into the decoding process. This reduces the number of decoding cycles required for each iteration, resulting in substantial increase in decoding throughput. The explanation of the grouping operation is as follows.

Figure 5:
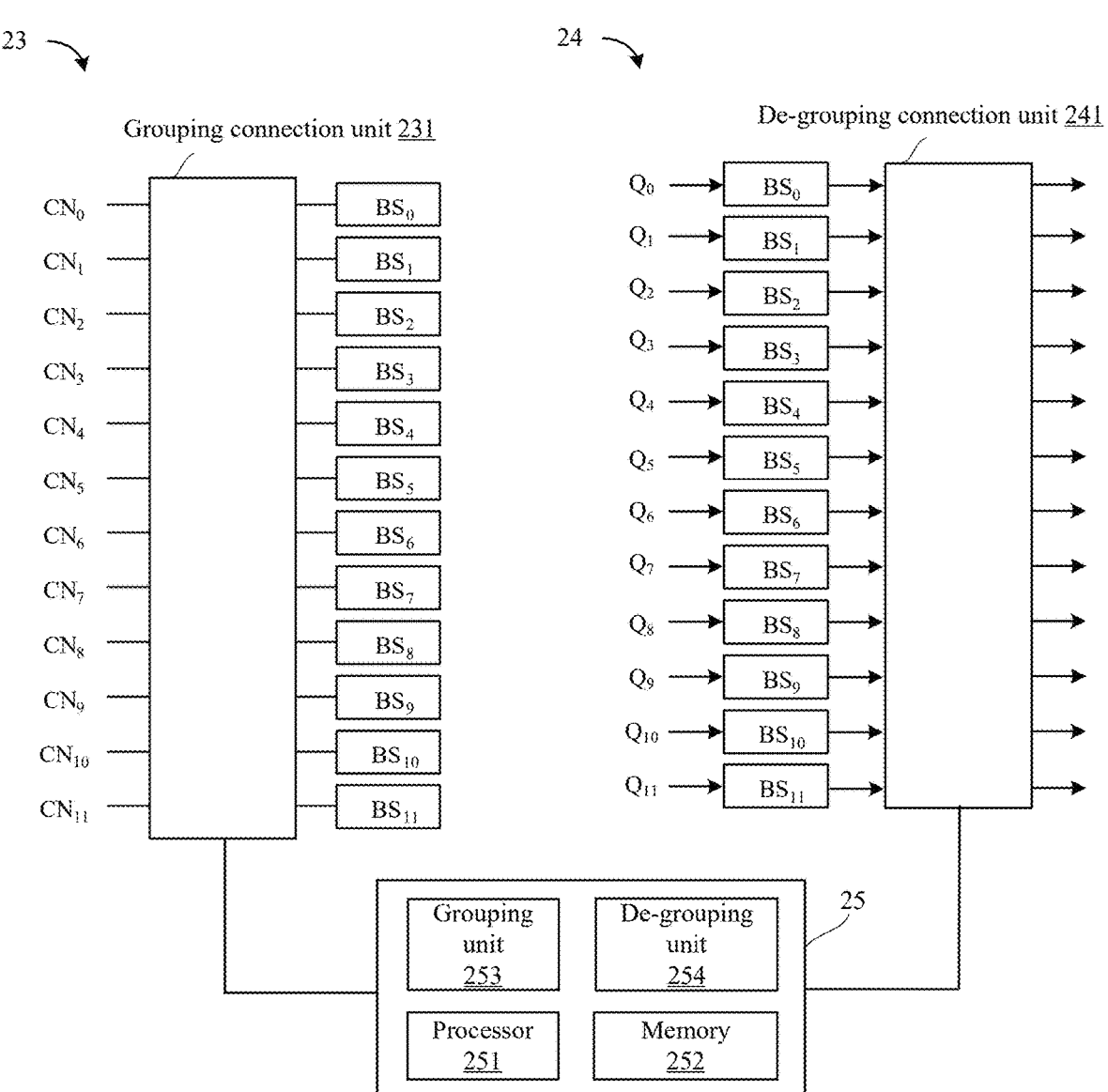
FIG. 5 illustrates a block diagram of the C2V unit and the V2C unit according to the first embodiment.
Figure 6:
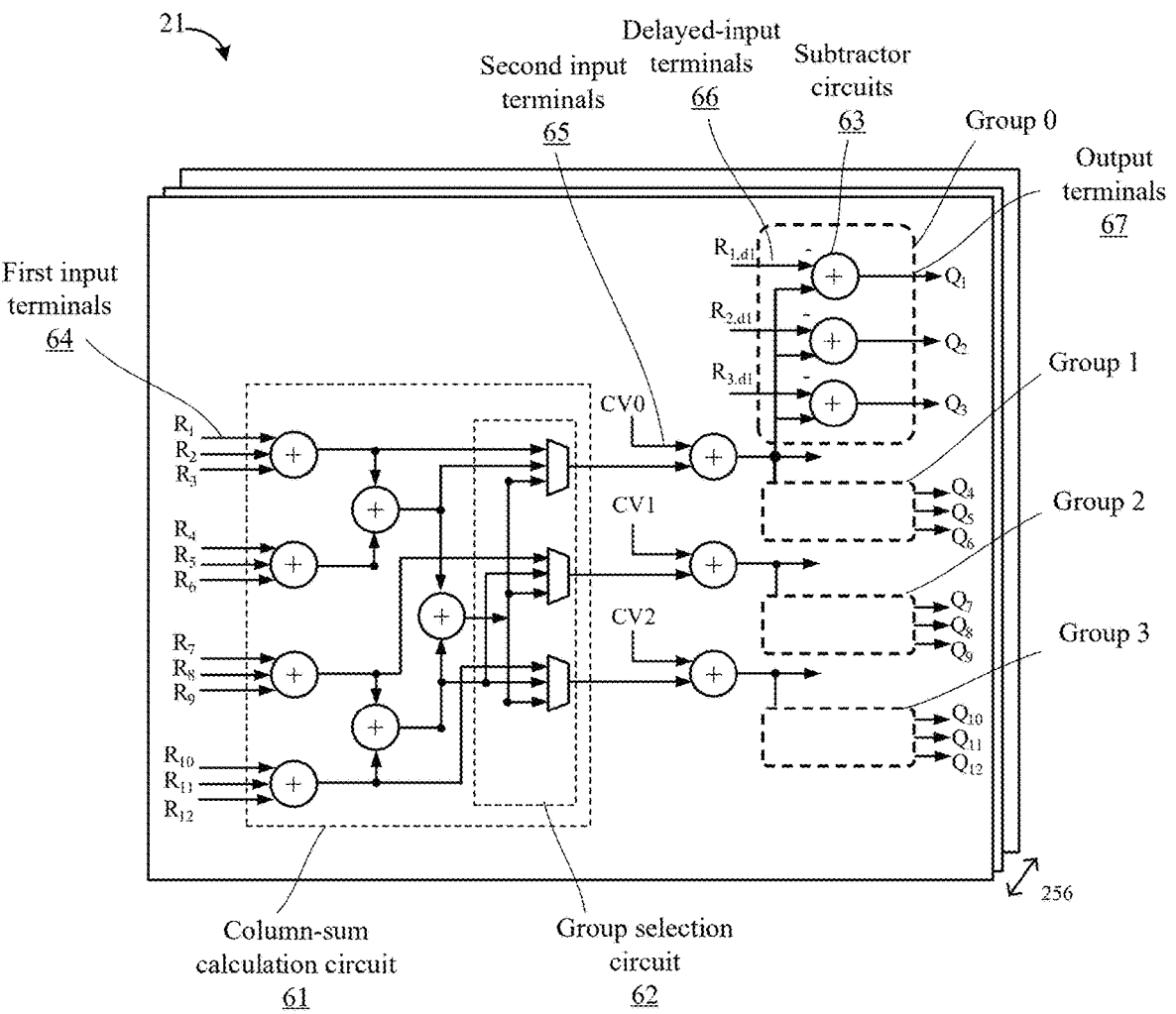
FIG. 6 illustrates a circuit diagram of the VN unit according to the first embodiment.

Please refer to FIG. 4, FIG. 5, and FIG. 6. FIG. 4 illustrates a schematic diagram of grouping operation according to the first embodiment. FIG. 5 illustrates a block diagram of the C2V unit and the V2C unit according to the first embodiment. And FIG. 6 illustrates a circuit diagram of the VN unit according to the first embodiment.

As shown in FIG. 5, the controller 25 in the decoder 112 comprises a processor 251, a memory 252, a grouping unit 253, and a de-grouping unit 254. The memory 252 is utilized for storing the compressed matrix and the associated program codes. When the processor 251 executes the program codes, it directs the grouping unit 253 and the de-grouping unit 254 to carry out the grouping and de-grouping operations.

As shown in FIG. 4, the grouping unit 253 of the controller 25 merges/compresses at least two columns in the base matrix according to the grouping strategy. For example, FIG. 4 illustrates the merging of the first column M1 and second column M2 in the base matrix of FIG. 3. In this embodiment, the grouping strategy stipulates that the number of the variable nodes corresponding to each row of the columns being merged is at most one. Specifically, each element of the base matrix is either a non-blank one or a blank one, where a non-blank element is represented as 0 or a positive integer. Merging multiple columns means to combine all non-blank elements in these columns into one column. Furthermore, "the number of the variable nodes corresponding to each row of the columns being merged is at most one" means that each row of the columns being merged contains at most one non-blank element.

As shown in FIG. 3, based on the grouping strategy of this embodiment, the number of non-blank elements in each column of the compressed matrix is at most 12. The original size of the base matrix is 12×69. After compression, a compressed matrix of size 12×27 (with columns from S1 to S27) is obtained.

The grouping unit 253 also carries out grouping the elements in each column of the compressed matrix so that the elements corresponding to the same column in the base matrix are grouped together. For instance, as shown in FIG. 4, the grouping unit 253 combines the first column M1 and the second column M2 of the base matrix and assigns a group number (such as group 0) to indicate that the origin is the first column M1 of the base matrix, along with another group number (such as group 1) to indicate that the origin is the second column M2 of the base matrix.

The grouping unit 253 also assigns an index to each element, such as h(1,1), h(1,2), etc., when assigning a group number to the element. The index h(m, n) represents that the element comes from the m-th column and the n-th row of the base matrix. In addition, the memory 252 is utilized for storing the compressed matrix along with the group number and the index of each element.

As illustrated in FIG. 5, the C2V unit 23 comprises a grouping connection unit 231, which receives the C2V messages $CN_0$~$CN_{11}$ updated by the CN unit 22, and then sends them to the VN unit 21 via the barrel shifters $BS_0$~$BS_{11}$. The number of the C2V messages $CN_0$~$CN_{11}$ is the same as the number of rows in the base matrix, while the number of the barrel shifters $BS_0$~$BS_{11}$ (equivalent to the number of the first input terminals 64 of the VN unit 21 in FIG. 6) is related to the grouping strategy. Specifically, in this embodiment, as shown in FIG. 6, the number of the first input terminals 64 of the VN unit is N (e.g. 12). Therefore, as shown in FIG. 4, in the compressed matrix, the number of non-blank elements in each column is at most N (i.e. 12).

In this embodiment, the grouping unit 253 is responsible for directing the grouping connection unit 231 to reorder the elements in each column of the compressed matrix such that the elements of the same group in the same column are placed together. Optionally, in this embodiment, the grouping connection unit 231 can be implemented by 12 multiplexers. Specifically, the group number of each element of each column in the compressed matrix is fed into its respective multiplexer, enabling the multiplexers to place the elements of the same group together according to the group number. For example, as illustrated in FIG. 4, the grouping connection unit 231 reorders the element values {80, 0, 91, 105, 170, 46, 137, 118, 208, 0, 209, 53} of the first column in the compressed matrix to {80, 105, 137, 0, 209, 53, 0, 91, 170, 46, 118, 208}, such that the elements of Group 0 and Group 1 are placed together. The grouping connection unit 231 then sends the reordered elements to the corresponding first input terminals 64 of the VN unit through the barrel shifters $BS_0$~$BS_{11}$.

As shown in FIG. 6, the VN unit 21 comprises a column-column-sum calculation circuit 61, a group-selection circuit 62, subtractor circuits 63, first input terminals 64, second input terminals 65, delayed-input terminals 66, and output terminals 67. The column-column-sum calculation circuit 61 consists of multiple adders.

As shown in FIG. 6, for each decoding cycle, the first input terminals 64 of the VN unit 21 receive a column of the compressed matrix. For convenience, the values at the first input terminals 64 are denoted as $R_1$ to $R_{12}$, respectively. It should be noted that these values are entered to the first input terminals 64 in the order of the group number, rather than in the order of their row number in the compressed matrix. Furthermore, the first input terminals 64 are divided into multiple subsets. In this embodiment, the first input terminals 64 are divided into four subsets of three terminals each. The column values from the same group are allocated to one or more subsets, with each subset exclusively receiving values from the same group. As an example, in the compressed matrix, if the column being processed during this decoding cycle contains four elements from Group 0 and six elements from Group 1, the four elements of Group 0 are divided into two subsets of size 3 to form $R_1$ to $R_6$ at the first input terminals 64, wherein the last two values $R_5$ and $R_6$ of the second subset are filled with zeros. Meanwhile, the six elements of Group 1 are divided into another two subsets to form $R_7$ to $R_9$ and $R_{10}$ to $R_{12}$ at the first input terminals 64.

As shown in FIG. 6, the first input terminals 64 receive the values $R_1$ to $R_{12}$, and the column-column-sum calculation circuit 61 is utilized to calculate the total value from the same group. In the column-column-sum calculation circuit 61, the sum values of various subset combinations are calculated, and the group-selection circuit 62 selects the sum values to output total values according to the grouping strategy. In this embodiment, as an example, the column-column-sum calculation circuit 61 comprises four first-stage adders, two second-stage adders, and one third-stage adder. Each first-stage adder is associated with a subset, producing the total value of that subset as output. Two first-stage adders' outputs are fed into each second-stage adder, while the two second-stage adders' outputs are received by the third-stage adder.

As shown in FIG. 6, the group-selection circuit 62 is coupled to the controller 25, and it obtains relevant information stored in the memory 252 including the compressed matrix and the group number and index of each matrix element. The outputs of the first-stage adders, second-stage adders and third-stage adders in the column-column-sum calculation circuit 61 are connected to the group-selection circuit 62. Based on the associated group number and index, the controller 25 generates control signals for the multiplexers in the group-selection circuit 62 to output the total value of each group. The output could be either the total value of one subset from one of the first-stage adders, or the total value of two subsets from one of the second-stage adders, or the total value of the four subsets from the third-stage adder. As a result, the column-column-sum calculation circuit 61 generates the total value of each group.

As shown in FIG. 6, for each decoding cycle, the second input terminals 65 are used to receive the reliability values of the variable nodes associated with the current decoding cycle, denoted as CV0~CV2. The reliability values are used to convey information about the reliability of each variable node. The decoder uses the reliability values and iteratively update the estimates of the variable nodes. The posterior probability (APP) value of the variable node can be obtained based on the output of the column summation circuit 61 calculates and the corresponding reliability value.

As shown in FIG. 6, the delayed input terminals 66 receive the values $R_1$~$R_{12}$ during the previous decoding cycle, denoted by $R_{1,dI}$~$R_{12,dI}$. The V2C messages $Q_1$~$Q_{12}$ during the current decoding cycle are calculated by subtracting $R_{1,dI}$~$R_{12,dI}$, through the subtractor circuits 63, from the sum of the reliability value and the output of the column-column-sum calculation circuit 61. Specifically, in matrix form, the calculation formula for the V2C message Q ($Q_1$~$Q_{12}$), is given as follows:

$Q^I = CV + \Sigma R^{I-1} - R^{I-1}$, wherein I and I–1 are the current and previous iteration indexes, CV represents the reliability values CV0~CV2, $\Sigma R^{I-1}$ represents the outputs of the column-column-sum calculation circuit 61, and $R^{I-1}$ represents $R_{1,dI}$~$R_{12,dI}$.

As shown in FIG. 6, the output terminals 67 will output the V2C messages in the order of group number. In this embodiment, the number of non-blank elements in each column of the compressed matrix is at most 12, matching the 12 input terminals 64 of the VN unit. During each iterative calculation, all values in a column of the compressed matrix can be simultaneously inputted into the first input terminals 64 of the VN unit, facilitating the update of the V2C messages for the current decoding cycle.

As shown in FIG. 5, the V2C unit 24 comprises a plurality of barrel shifters $BS_0$~$BS_{11}$ and a de-grouping connection unit 241. The plurality of barrel shifters $BS_0$~$BS_{11}$ respectively receive the V2C messages $Q_0$~$Q_{11}$ from the VN unit 21 and rotate the V2C messages $Q_0$~$Q_{11}$ in accordance with the columns of the compressed matrix involved in the current decoding cycle. The de-grouping connection unit 241 under the control of the controller 25 is responsible for reallocating the barrel-shifted V2C messages. Optionally, in this embodiment, the de-grouping connection unit 241 can be implemented by 12 multiplexers. The group numbers and the row-column indexes associated with the columns of the compressed matrix involved during the current decoding cycle serves as control signals to the multiplexers of the de-grouping connection unit 241, so that the multiplexers can reallocate the barrel-shifted V2C messages back to its original row-column order. It should be understandable that, the group number and row-column index of each compressed matrix element are stored in the memory 252. By utilizing this data, the de-grouping unit 254 leverages the group numbers and row-column indexes corresponding to the current decoding cycle to guide the de-grouping connection unit 241 in updating the V2C message matrix. This is achieved by correctly storing each barrel-shifted V2C message into the V2C message matrix based on the row-column index. With the updated V2C message matrix in place, the CN unit 22 proceeds to update the C2V messages for the variable nodes accordingly.

For example, as shown in FIG. 4, the VN unit 21 receives the first column of the compressed matrix through the plurality of first input terminals as input values, the elements of the column of the compressed matrix are ordered according to the group number before being input to the plurality of first input terminals. Therefore, the values present at the first input terminals 64 will be {80, 105, 137, 0, 209, 53, 0, 91, 170, 46, 118, 208}, along with their corresponding row numbers in the compressed matrix being {1, 4, 7, 10, 11, 12, 2, 3, 5, 6, 8, 9}. It can be seen that post the VN unit 21's operation, the row number associated with the V2C messages updated by the VN unit 21 will remain as {1, 4, 7, 10, 11, 12, 2, 3, 5, 6, 8, 9}. Next, the de-grouping unit 254 is responsible for managing the de-grouping connecting unit 241 in order to reorder the V2C messages from the VN unit 21. This process ensures that the row numbers associated with the V2C messages are restored to 1 to 12.

In the first embodiment of the present invention, based on the proposed grouping strategy, the number of non-blank elements in each column of the compressed matrix is at most 12. The base matrix of size 12×69 is compressed a compressed matrix of size of 12×27 (as shown in FIG. 3, from the first column S1 to the 27th column S27). By this way, reducing the number of column blocks to be processed in each iteration from 69 to 27. In other words, the decoding period of each iteration is reduced from 69 to 27, drastically enhancing the decoding throughput. Moreover, in this invention, the memory 252 is only required to store a compressed matrix of size 12×27 along with another matrix containing the group number and index of each matrix element. It is evident that the storage capacity for these two matrices is significantly lower compared to that for the base matrix of size 12×69. Thus, this invention can also effectively reduce the storage cost of memory 252.

Figure 7:
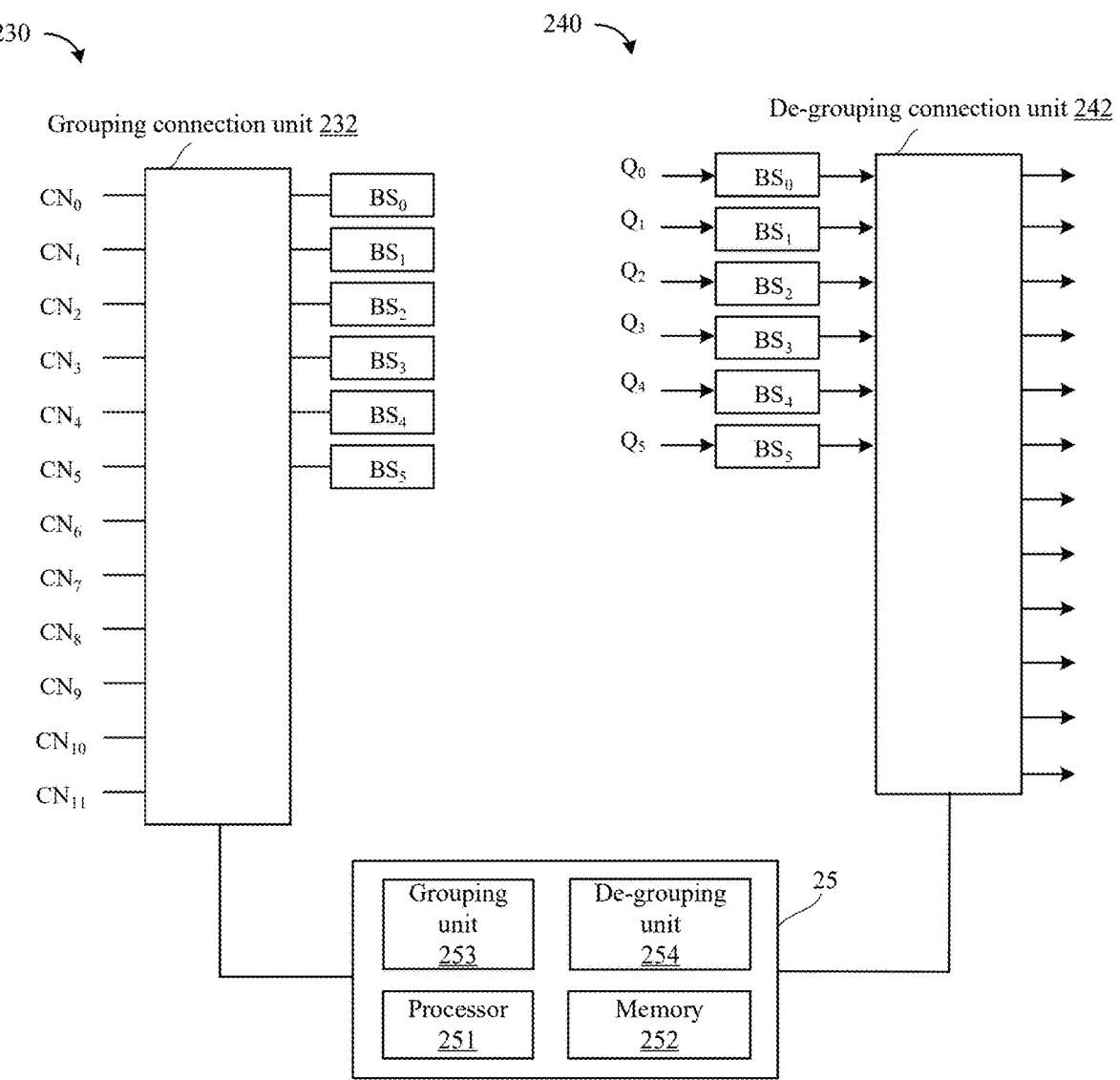
FIG. 7 illustrates a block diagram of the C2V unit and the V2C unit according to the second embodiment of the present invention.
Figure 8:
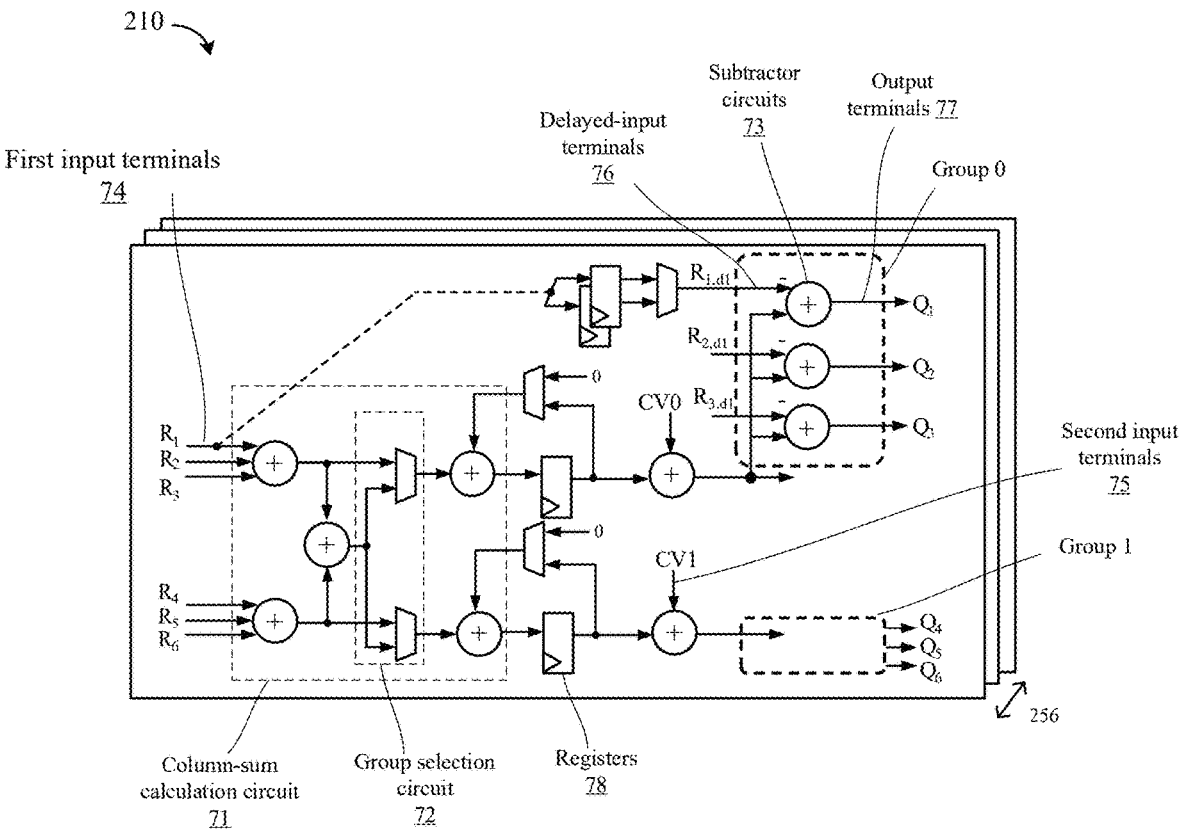
FIG. 8 illustrates the circuit diagram of the VN unit according to the second embodiment.

Please refer to FIG. 7 and FIG. 8, where FIG. 7 illustrates a schematic diagram of the C2V unit 230 and the V2C unit 240 according to a second embodiment of the present invention, and FIG. 8 illustrates a circuit diagram of the VN unit 210 according to the second embodiment. It should be understandable that the second embodiment utilizes the same structure as the decoder mentioned above. While both the first and second embodiments share similarities, the difference lies in the circuit configuration and the grouping strategy of the VN unit, as described in further detail below.

As shown in FIG. 7, the controller 25 of the decoder 112 comprises a processor 251, a memory 252, a grouping unit 253, and a de-grouping unit 254. The memory 252 is utilized for storing the compressed matrix and the associated program codes. When the processor 251 executes the program codes, it directs the grouping unit 253 and the de-grouping unit 254 to carry out the grouping and de-grouping operations.

As shown in FIG. 7, the grouping unit 253 of the controller 25 merges/compresses at least two columns in the base matrix according to a grouping strategy. In this embodiment, the grouping strategy stipulates that the number of the variable nodes corresponding to each row of the columns being merged is at most one. Specifically, each element of the base matrix is either a non-blank one or a blank one, where a non-blank element is represented as 0 or a positive integer. Merging multiple columns means to combine all non-blank elements in these columns into one column. Furthermore, "the number of the variable nodes corresponding to each row of the columns being merged is at most one" means that each row of the columns being merged contains at most one non-blank element.

In the grouping strategy of this embodiment, the number of non-blank elements in each column of the compressed matrix is at most P, where P is an integer less than N. For example, with P set to 6, as shown in FIG. 3, where the number of non-blank elements in the first column M1 of the base matrix is 6. Following to the grouping strategy, the first column M1 of the base matrix does not merge with other columns and directly serves as the first column of the compressed matrix. Similarly, the column M18 and the column M19 of the base matrix, each with 3 non-blank elements, can be merged to form a single column in the compressed matrix.

In the grouping strategy of this embodiment, when the number of non-blank elements in a column of the base matrix exceeds P, the elements of that column are split. For example, with P set to 6, as shown in FIG. 3, the number of non-blank elements in the column M68 of the base matrix is 12. Following to the grouping strategy, the 12 elements of the column M68 are split to form two columns in the compressed matrix.

The grouping unit 253 also carries out grouping the elements in each column of the compressed matrix so that the elements corresponding to the same column in the base matrix are grouped together. For instance, the grouping unit 253 combines the column M18 and the column M19 of the base matrix, as shown in FIG. 3, and assigns a group number (such as group 0) to indicate that the origin is the column M18 of the base matrix, along with another group number (such as group 1) to indicate that the origin is the column M19 of the base matrix.

The grouping unit 253 also assigns an index to each element, such as h(1,1), h(1,2), etc., when assigning a group number to the element. The index h(m, n) represents that the element comes from the m-th column and the n-th row of the base matrix. In addition, the memory 252 is utilized for storing the compressed matrix along with the group number and the index of each element.

As shown in FIG. 7, the C2V unit 230 comprises a grouping connection unit 232, which receives the C2V message $CN_0$~$CN_{11}$ updated by the CN unit 22 and send them to the VN unit 210 via the barrel shifter $BS_0$~$BS_5$. The number of the C2V message $CN_0$~$CN_{11}$ is the same as the number of rows in the base matrix. The number of the barrel shifters $BS_0$~$BS_5$ (equivalent to the number of the first input terminals 74 of the VN unit 210 in FIG. 8) is related to the grouping strategy. Specifically, in this embodiment, the number of non-blank elements in each column of the compressed matrix, is at most P.

In this embodiment, the grouping unit 253 is responsible for directing the grouping connection unit 232 to reorder the elements in each column of the compressed matrix such that the elements of the same group in the same column are placed together. Optionally, in this embodiment, with P set to 6 as an example, the grouping connection unit 232 can be implemented by 6 multiplexers. Specifically, the group number of each element of each column in the compressed matrix is fed into its respective multiplexer, enabling the multiplexers to place the elements of the same group together according to the group number. The grouping connection unit 232 then sends the reordered elements to the corresponding first input terminals 74 of the VN unit through the barrel shifters $BS_0$~$BS_5$.

As shown in FIG. 8, the VN unit 210 comprises a column-column-sum calculation circuit 71, a group-selection circuit 72, subtractor circuits 73, first input terminals 74, second input terminals 75, delayed-input terminals 76, and output terminals 77, and registers 78.

As shown in FIG. 8, during each decoding cycle, the first input terminals 74 receive a column of the compressed matrix. For convenience, the values at the first input terminals 64 are denoted as $R_1$ to $R_6$, respectively. It should be noted that these values are entered to the first input terminals 74 in the order of group number, rather than in the order of their row number in the compressed matrix. The first input terminals 74 are divided into two subsets of three terminals each.

As shown in FIG. 8, the first input terminals 74 receive the values $R_1$ to $R_6$, and the column-column-sum calculation circuit 71 is utilized to calculate the total value from the same group. In the column-column-sum calculation circuit 71, the total values of various subset combinations are calculated, and the group-selection circuit 72 selects the total values as the outputs according to the grouping strategy. In this embodiment, the column-column-sum calculation circuit 71 comprises two first-stage adders and one second-stage adder. Each first-stage adder is associated with a subset, producing the total value of that subset as output. The second-stage adder is connected to two first-stage adders.

As shown in FIG. 8, the group-selection circuit 72 is coupled to the controller 25, and it obtains relevant information stored in the memory 252 including the compressed matrix and the group number and index of each matrix element. The outputs of the first-stage adders, second-stage adders and third-stage adders in the column-column-sum calculation circuit 71 are connected to the group-selection circuit 72. According to the associated group number and index, the controller 25 generates control signals for the multiplexers in the group-selection circuit 72 to output the total value of each group. The output could be either the total value of one subset from one of the first-stage adders, or the total value of two subsets from one of the second-stage adders. As a result, the column-column-sum calculation circuit 71 outputs the total value of each group.

In the grouping strategy of this embodiment, when the number of non-blank elements in a column of the base matrix exceeds P, the column of the base matrix is split to form two columns in the compressed matrix. In this scenario, the VN unit 210 will undergo two decoding cycles to receive and process the two corresponding columns of the compressed matrix, calculating the total value of its inputs. As shown in FIG. 8, two registers 78 are connected to the column-column-sum calculation circuit 71 to store the total value calculated in the previous decoding cycle. The column-sum calculation circuit 71 comprises two third-order adders that combine the total value of the plurality of first input terminals of the VN unit 210 in the current decoding cycle with the values of the registers, resulting in the total value of the neighboring columns in the compressed matrix.

Taking P set to 6 and the column M68 of the base matrix as an example, the column M68 contains 12 non-blank elements which are split to form two columns C1 and C2 in the compressed matrix. During the first decoding cycle, the VN unit 210 calculates the total value of the column. C1 and stores it in the registers 78. During the second decoding cycle, the VN unit 210 calculates the total value of the column C2, and the third-order adders then combine the total value from the current decoding cycle with the value stored in the registers 78, resulting in the total value of the columns C1 and C2 in the compressed matrix.

As shown in FIG. 8, the second input terminals 75 are used to receive the reliability values of the variable nodes associated with the current decoding cycle, denoted as CV0 and CV1. The reliability values are used to convey information about the reliability of each variable node. The decoder uses the reliability values and iteratively update the estimates of the variable nodes. The posterior probability (APP) value of the variable node can be obtained based on the output of the column summation circuit 71 calculates and the corresponding reliability value.

As shown in FIG. 8, the delayed input terminals 76 receive the values $R_1 \sim R_6$ in the previous decoding cycle, denoted by $R_{1,dl} \sim R_{6,dl}$. The V2C messages $Q_1 \sim Q_6$ for the current decoding cycle are calculated by subtracting $R_{1,dl} \sim R_{6,dl}$, through the subtractor circuits 73, from the sum of the reliability value and the output of the column-column-sum calculation circuit 71. The aforementioned calculation formula for the V2C message Q will not be further elaborated here.

As shown in FIG. 7, the V2C unit 240 comprises a plurality of barrel shifters $BS_0 \sim BS_5$ and a de-grouping connection unit 242. The plurality of barrel shifters $BS_0 \sim BS_5$ respectively receive the V2C messages $Q_0 \sim Q_5$ from the VN unit 21 and rotate the V2C messages $Q_0 \sim Q_5$ in accordance with the columns of the compressed matrix involved in the current decoding cycle. The de-grouping connection unit 242 under the control of the controller 25 is responsible for reallocating the barrel-shifted V2C messages. Optionally, for example, with P set to 6, the de-grouping connection unit 242 can be implemented by 6 multiplexers. The group numbers and the row-column indexes associated with the columns of the compressed matrix involved in the current decoding cycle serves as control signals to the multiplexers of the de-grouping connection unit 242, so that the multiplexers can reallocate the barrel-shifted V2C messages back to its original row-column order. It should be understandable that, the group number and row-column index of each compressed matrix element are stored in the memory 252. By utilizing this data, the de-grouping unit 254 leverages the group numbers and row-column indexes corresponding to the current decoding cycle to guide the de-grouping connection unit 242 in updating the V2C message matrix. This is achieved by correctly storing each barrel-shifted V2C message into the V2C message matrix based on the row-column index. With the updated V2C message matrix in place, the CN unit 22 proceeds to update the C2V messages for the variable nodes accordingly.

In the second embodiment of the present invention, utilizing the grouping strategy, the base matrix is condensed into a compressed matrix with a reduced number of columns. The number of columns to be processed in each iteration is reduced. As a result, the decoding cycles for each iteration are reduced and significantly boosting decoding throughput. Furthermore, while the compressed matrix in the second embodiment may have more columns and necessitate additional decoding cycles compared to the first embodiment, it ultimately reduces the hardware resources needed by the VN unit 210. This advantage is particularly beneficial for cutting down manufacturing costs.

This invention also provides a flash memory access method facilitated by a memory controller. The flash memory controller is coupled to the flash memory for the transmission of data and commands. The detailed structure and functionalities of the flash memory controller and flash memory have been outlined earlier and will not be reiterated here. In particular, the microprocessor of the flash memory controller is designed to control the general functioning of the memory device. The microprocessor runs a code to carry out the decoding process steps according to the first embodiment to the second embodiment as described above.

Please refer to FIG. 9, which illustrates a flowchart of the flash memory access method, applied to a memory controller, according to an embodiment of the present invention. The access method of flash memory comprises at least steps S91 to S95. In step S91, the read information is received from a flash memory. In step S92, the decoding of the read information is carried out by a decoder in accordance with a low-density parity-check code base matrix of size N×M. In step S93, the base matrix is converted to a compressed matrix of size N×S, where S is less than M. In step S94, the elements in each column of the compressed matrix are grouped so that the elements corresponding to the same column in the base matrix are grouped together. In step S95, the VN unit and the CN unit updates the V2C messages and the C2V messages to finally come out a decoded result, which suppose should converge to form a codeword. During each decoding cycle, the values of a column of the compressed matrix are input into the plurality of first input terminals of the VN unit in the order of group number.

In some embodiments, the VN unit comprises: a column-column-sum calculation circuit and a group-selection circuit. The method further comprises: the column-column-sum calculation circuit calculates the total values of various input subset combinations, and the group-selection circuit selects the total values as the outputs according to the grouping strategy so as to sum up the values from the same group.

In some embodiments, the plurality of first input terminals are divided into a plurality of subsets, with each subset being connected to an adder, and the input values on each subset of the first input terminals are associated with the same group number.

In some embodiments, in the process of converting the base matrix into a compressed matrix of size N×S, the method further comprises merging at least two columns in the base matrix according to a grouping strategy, where the grouping strategy ensures that the maximum number of the variable nodes corresponding to each row in the at least two columns of base matrix is one.

In some embodiments, the grouping strategy further ensures that the number of non-blank elements in the at least two columns of the base matrix is at most N, and the VN unit performs calculation on a column of the compressed matrix to update the V2C messages iteratively.

In some embodiments, the number of the plurality of first input terminals of the VN is N, and elements in a column of the compressed matrix are entered to the plurality of first input terminals in an order of group.

In some embodiments, the grouping strategy also comprises at least two blocks in the matrix, with at most P non-blank blocks, where P is less than N. When the number of non-blank elements in a column of the base matrix is greater than P, the column of the base matrix is split to form two columns in the compressed matrix. During each decoding cycle, the VN unit operates in accordance with a column of the compressed matrix.

In some embodiments, the VN unit further contains registers to store the total value of the plurality of first input terminals of the VN unit during the previous decoding cycle. The VN unit adds the total value of the plurality of first input terminals of the VN unit during the current decoding cycle with the values of the registers to obtain the total value of two neighboring columns in the compressed matrix, which correspond to a column of the base matrix containing over P non-blank elements.

In some embodiments, the number of the plurality of first input terminals of the VN is N, and elements in a column of the compressed matrix are entered to the plurality of first input terminals in an order of group.

In some embodiments, the decoder further comprises a C2V unit, which is coupled between the VN unit and the CN unit, to update the C2V messages for the VN unit.

The aforementioned details represent only specific implementations of the present disclosure. However, the protection scope of the present disclosure is not limited thereto. Any modifications or replacements that can be easily devised by those skilled in the art within the technical scope of the present disclosure should all fall within the protection scope of the present disclosure. Consequently, the protection scope of the present disclosure should be defined by the protection scope of the appended claims.

What is claimed is:

1. A flash memory controller for accessing a flash memory, wherein the flash memory controller comprises:
   a read-only memory for storing a program code;
   a microprocessor for executing the program code to control access to the flash memory; and
   a decoder for performing decoding operation based on an N×M base matrix of a low-density parity-check (LDPC) code to decode read information from the flash memory, wherein the decoder comprises:
      a controller for transforming the base matrix into a compressed matrix of size N×S, wherein S is less than M, each element in each column of the compressed matrix is associated with a group number, and the elements from the same column of the base matrix are assigned the same group number;
      a variable node (VN) unit, coupled to the controller and comprises a plurality of first input terminals;
      a check node (CN) unit, coupled to the VN unit, wherein, in an iterative manner, the VN unit updates a plurality of V2C messages to the CN unit and the CN unit updates a plurality of C2V messages to the VN unit in order to finally generate a decoding result;
   wherein during each decoding cycle of an iteration, the VN unit receives a column of the compressed matrix through the plurality of first input terminals as input values, the elements of the column of the compressed matrix are ordered according to the group number before being input to the plurality of first input terminals.

2. The flash memory controller according to claim 1, wherein the VN unit comprises:
   a column-sum calculation circuit, comprising a plurality of adders and
   a group-selection circuit;
   wherein the column-column-sum calculation circuit calculates a plurality of total values based on the input values and the group-selection circuit selects the sum values to generate total value of each group of input values.

3. The flash memory controller according to claim 2, wherein the plurality of the first input terminals are divided into a plurality of subsets, with each subset being connected to an adder, and the input values on each subset of the first input terminals are associated with the same group number.

4. The flash memory controller according to claim 1, wherein the controller of the decoder comprises a grouping unit that merges at least two columns of the base matrix according to a grouping strategy, which ensures that each row within the at least two columns of the base matrix contains at most one non-blank element.

5. The flash memory controller according to claim 4, wherein the grouping strategy further ensures that the number of non-blank elements in the at least two columns of the base matrix is at most N, and the VN unit performs calculation on a column of the compressed matrix to update the V2C messages.

6. The flash memory controller according to claim 5, wherein the number of the plurality of first input terminals of the VN is N, and the elements in a column of the compressed matrix are entered to the plurality of first input terminals in an order of group number.

7. The flash memory controller according to claim 4, wherein the grouping strategy further comprises:
   the maximum number of non-blank elements in the at least two columns of the base matrix is P, with P being less than N; and
   when the number of non-blank elements in a column of the base matrix is greater than P, the column of the base matrix is split to form two columns in the compressed matrix.

8. The flash memory controller according to claim 7, wherein the VN unit further contains registers to store the total value of the plurality of first input terminals of the VN unit in the previous decoding cycle, and the VN unit adds the total value of the plurality of first input terminals of the VN unit in the current decoding cycle with the values of the registers to obtain the total value of two neighboring columns in the compressed matrix.

9. The flash memory controller according to claim 7, wherein the number of the plurality of first input terminals of the VN is P, and elements in a column of the compressed matrix are entered to the plurality of first input terminals in an order of group.

10. The flash memory controller according to claim 1, wherein the decoder further comprises a C2V unit coupled between the VN unit and the CN unit to update the C2V messages for the VN unit.

11. A flash memory access method, applied in a memory controller, comprising:

receiving read information from a flash memory;

decoding, through a decoder in the memory controller, the read information in accordance with a low-density parity-check (LDPC) code base matrix of size N×M;

transforming the base matrix into a compressed matrix of size N×S, wherein S is less than M;

grouping elements in each column of the compressed matrix so that each element in each column of the compressed matrix is associated with a group number and the elements from the same column of the base matrix are assigned the same group number;

updating a plurality of V2C messages and C2V messages, through a variable node (VN) unit and a check node (CN) unit of the memory controller, wherein, for each decoding cycle, elements in a column of the compressed matrix are entered as input values to a plurality of first input terminals of the VN unit in an order of group number.

12. The flash memory access method according to claim 11, wherein the VN unit comprises a column summation circuit containing a plurality of adders and a group-selection circuit, and the method further comprises: the column-column-sum calculation circuit calculates a plurality of total values based on the input values and the group-selection circuit selects the total values to generate total value of each group of input values.

13. The flash memory access method according to 12, wherein the plurality of the first input terminals are divided into a plurality of subsets, with each subset being connected to an adder, and the input values on each subset of the first input terminals are associated with the same group number.

14. The flash memory access method according to claim 11, wherein the transforming the base matrix into a compressed matrix of size N×S comprises merging at least two columns of the base matrix according to a grouping strategy, which ensures that each row within the at least two columns of the base matrix contains at most one non-blank element.

15. The flash memory access method according to claim 14, wherein the grouping strategy further ensures that the number of non-blank elements in the at least two columns of the base matrix is at most N, and the VN unit performs calculation on a column of the compressed matrix to update the V2C messages.

16. The flash memory access method according to claim 15, wherein the number of the plurality of first input terminals of the VN is N, and the elements in a column of the compressed matrix are entered to the plurality of first input terminals in an order of group number.

17. The flash memory access method according to claim 14, wherein the grouping strategy further comprises:

the maximum number of non-blank elements in the at least two columns of the base matrix is P, with P being less than N; and when the number of non-blank elements in a column of the base matrix is greater than P, the column of the base matrix is split to form two columns in the compressed matrix.

18. The flash memory access method according to claim 17, wherein the VN unit further contains registers to store the total value of the plurality of first input terminals of the VN unit in the previous decoding cycle, and the VN unit adds the total value of the plurality of first input terminals of the VN unit in the current decoding cycle with the values of the registers to obtain the total value of two neighboring columns in the compressed matrix.

19. The flash memory access method according to claim 17, wherein the number of the plurality of first input terminals of the VN is P, and elements in a column of the compressed matrix are entered to the plurality of first input terminals in an order of group.

20. The flash memory access method according to claim 11, wherein the decoder further comprises a C2V unit coupled between the VN unit and the CN unit to update the C2V messages for the VN unit.

\* \* \* \* \*